United States Patent
Don et al.

(10) Patent No.: US 11,853,561 B2
(45) Date of Patent: Dec. 26, 2023

(54) BACKUP INTEGRITY VALIDATION

(71) Applicant: Dell Products L.P., Hopkinton, MA (US)

(72) Inventors: Arieh Don, Newton, MA (US); Krishna Deepak Nuthakki, Bangalore (IN); Jehuda Shemer, Kfar Saba (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/719,416

(22) Filed: Apr. 13, 2022

(65) Prior Publication Data

US 2023/0333752 A1  Oct. 19, 2023

(51) Int. Cl.
*G06F 3/06* (2006.01)
*H04L 9/32* (2006.01)

(52) U.S. Cl.
CPC ............ *G06F 3/0622* (2013.01); *G06F 3/064* (2013.01); *G06F 3/067* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 9,448,893 B1* | 9/2016 | Whitehead | ............ | G06F 16/273 |
| 9,497,028 B1* | 11/2016 | Yu | ............ | H04L 63/06 |
| 10,235,090 B1* | 3/2019 | Baruch | ............ | G06F 11/1471 |
| 10,459,632 B1* | 10/2019 | Chen | ............ | G06F 3/0616 |
| 11,036,677 B1* | 6/2021 | Grunwald | ............ | G06F 3/067 |
| 2015/0143063 A1* | 5/2015 | Mutalik | ............ | H04L 67/10 711/162 |
| 2019/0034225 A1* | 1/2019 | Kuik | ............ | G06F 9/4856 |
| 2021/0240399 A1* | 8/2021 | Meiri | ............ | G06F 3/0614 |
| 2023/0106987 A1* | 4/2023 | Shemer | ............ | G06F 3/0671 707/692 |

* cited by examiner

*Primary Examiner* — Edward J Dudek, Jr.
*Assistant Examiner* — Ralph A Verderamo, III
(74) *Attorney, Agent, or Firm* — Anderson Gorecki LLP

(57) ABSTRACT

A primary storage array calculates signatures of chunks of production device data that are sent to a target device on a secondary storage array. The chunk signatures are sent to a signature device on the secondary storage array, where the chunk signatures are stored within the same LBA range on the signature device as their corresponding chunks are stored on the target device. Snaps of the target and signature device are created and associated as a snap pair. Later, the primary storage array calculates signatures of changed chunks of production device data that are sent to the target device. The changed chunk signatures are sent to the signature device. New snaps of the target and signature device are created and associated as a new snap pair. Chunk data is validated by calculating signatures of the chunks from the target device and comparing those signatures with the chunk signatures from the signature device.

20 Claims, 7 Drawing Sheets

BACKUP INTEGRITY VALIDATION

TECHNICAL FIELD

The subject matter of this disclosure is generally related to backups for data storage systems that maintain large storage objects.

BACKGROUND

High-capacity data storage systems such as storage area networks (SANs) and storage arrays are used to maintain large storage objects that can be accessed by multiple host servers. The storage systems include specialized, interconnected compute nodes that respond to input-output (IO) commands from instances of host applications that run on the host servers. Examples of host applications may include, but are not limited to, software for email, accounting, manufacturing, inventory control, and a wide variety of other business processes. Host application data is logically stored on the storage objects, which abstract the non-volatile drives on which the host application data is actually stored.

It is well known to create backups to avoid data loss. One technique for creating a backup of a storage object is for a host server to read the storage object data from a production storage array and write the data to a backup storage object on a backup storage array. A drawback of that technique is that it requires significant host server resources. Another technique is for the production storage array to push data directly to the backup storage array. The direct push technique is more efficient than using a host server but errors in the backup storage object may remain unknown until a restore operation is attempted. It is possible for the production storage array to read the backup storage object data from the backup storage array to verify data integrity, but that technique requires significant resources because the storage objects are typically large, e.g., hundreds of petabytes.

SUMMARY

In accordance with some implementations, a method comprises: receiving one or more chunks of data from a production device at a storage array; selecting at least one of the one more of the chunks of data by the storage array; and for each individually selected chunk: calculating a chunk signature; sending the chunk to a target device on a remote storage system; and sending the chunk signature to a signature device on the remote storage system.

In accordance with some implementations, an apparatus comprises: a storage array configured to select all chunks of data of a production device and, for each selected chunk individually: calculate a chunk signature; send the chunk to a target device on a remote storage system; and send the chunk signature to a signature device on the remote storage system.

In accordance with some implementations, a non-transitory computer-readable storage medium stores instructions that when executed by a processor perform a method comprising: selecting all chunks of data of a production device by a storage array and, for each selected chunk individually: calculating a chunk signature; sending the chunk to a target device on a remote storage system; and sending the chunk signature to a signature device on the remote storage system.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
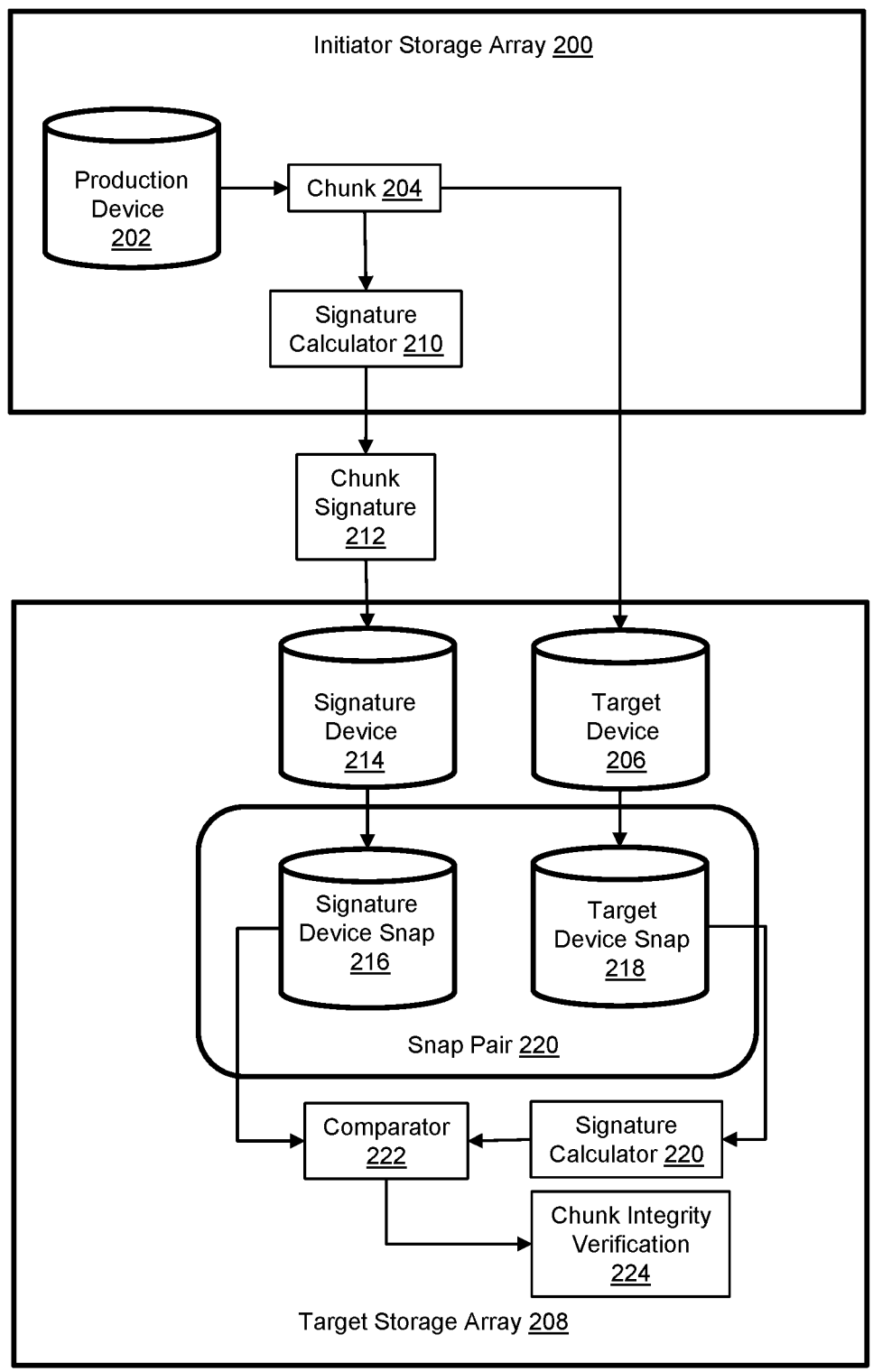
FIG. 1 illustrates a full device push and generation of a signature device on a target storage array.

FIG. 1 illustrates a full device push and generation of a signature device on a target storage array. An initiator storage array 200 is a production storage array that responds to IOs from host applications running on host servers to access data logically stored on a production device 202. In order to create a backup of the production device 202, the initiator storage array 200 selects chunks of data from the production storage device in sequence. The sequence in which chunks are selected may be determined based on the logical block addresses (LBAs) at which the chunks are stored on the production device, e.g., in ascending order. Chunk 204 is a representative chunk. The chunks may all have the same fixed size. The selected chunk 204 is pushed to a logical target device 206 on a target storage array 208. The target storage array may be specialized for backups, such as being configured with drives characterized by low cost-per-bit of storage. The chunk 204 is also processed by a digital signature calculator 210 on the initiator storage array 200 to calculate a chunk signature 212. The signature may be a hash or other value that uniquely represents chunk data in a smaller storage space. The chunk signature 212 is pushed to a signature device 214 on the target storage array 208. The process continues until all chunks of the production device 202 have been selected and pushed to the target device 206 and corresponding chunk signatures have been generated and pushed to the signature device 214.

When the full device push and corresponding chunk signature push is complete, the target storage array 208 creates a signature device snapshot 216 and a target device snapshot 218. Snapshots only contain data that has changed since the most recently generated snapshot but when mounted can provide non-changed data using references such as pointers to non-changed data in previously generated snaps and devices. The signature device snapshot 216 and the target device snapshot 218 are associated as a snap pair 220 that represents the state of the production device 202 at a specific point in time. Optionally, the target storage array 208 may use a signature calculator 220 to calculate signatures of the chunks on the target device snap 218 for comparison with the signatures from the signature device snap 216 using comparator 222 to provide a chunk integrity verification 224. Mismatching signatures indicate an error. Such verification generally requires that the target storage array 208 is capable of performing the signature calculations with the same algorithm, which is not always possible.

Figure 2:
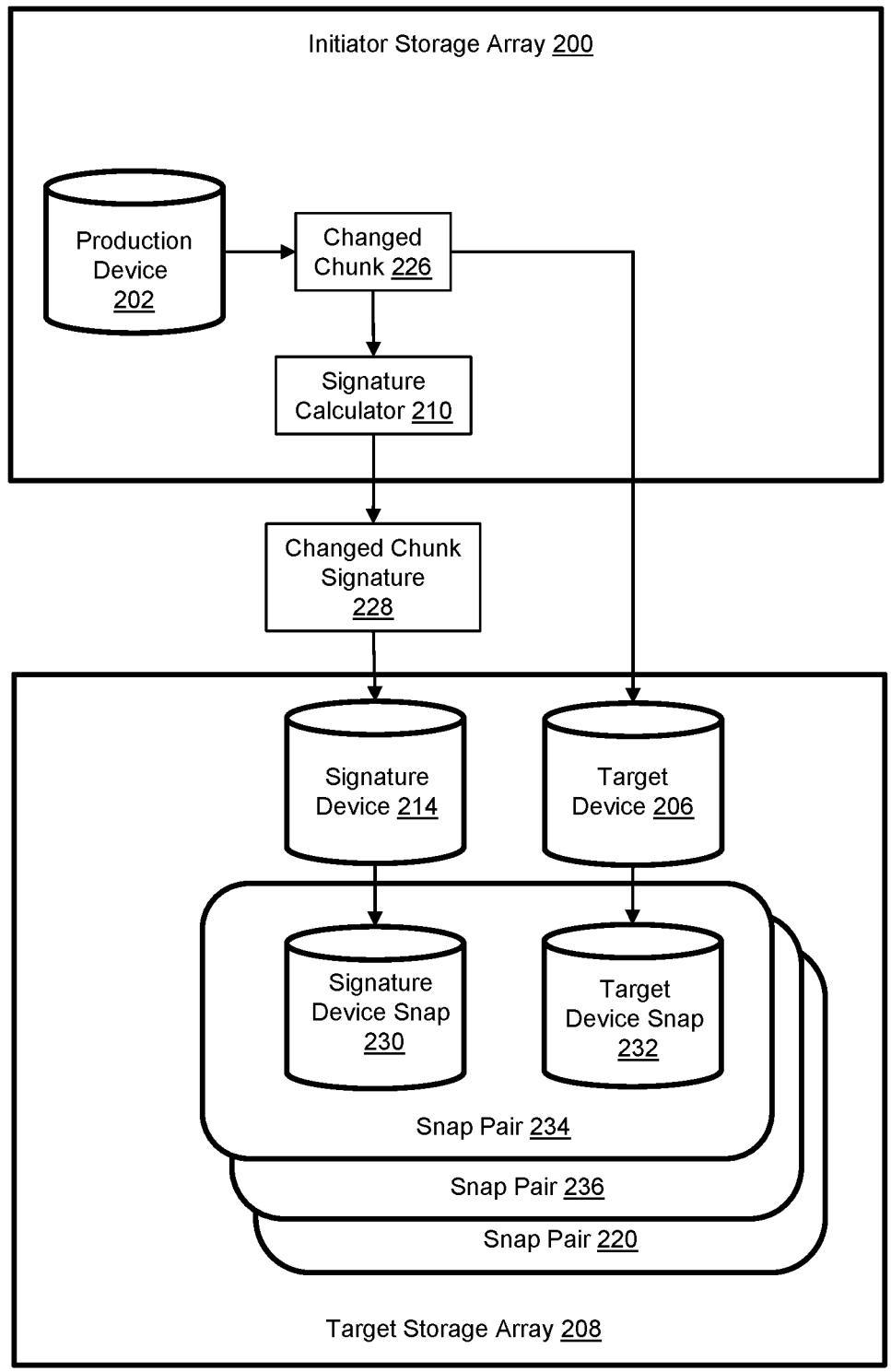
FIG. 2 illustrates a differential push and generation of a new snap pair.

FIG. 2 illustrates a differential push and generation of a new snap pair 234. A differential push can be performed periodically, responsive to user input, responsive to a triggering event, or any combinations thereof. In order to perform a differential push of the production device 202, the initiator storage array 200 selects the changed chunks of data from the production storage device in sequence. Changed chunk 226 is representative. The selected changed chunk is pushed to the target device 206 on the target storage array 208. The changed chunk 226 is also processed by the digital signature calculator 210 on the initiator storage array 200 to calculate a changed chunk signature 228. The changed chunk signature 228 is pushed to the signature device 214 on the target storage array 208. The process continues until all changed chunks have been selected and pushed to the target device 206 and corresponding changed chunk signatures have been calculated and pushed to the signature device 214. The target storage array 208 then creates a new signature device snapshot 230 and a new target device snapshot 232. The new signature device snapshot 230 and the new target device snapshot 232 are associated as a new snap pair 234 that represents the state of the production device 202 at a specific point in time that differs from other snap pairs 220, 236.

Figure 3:
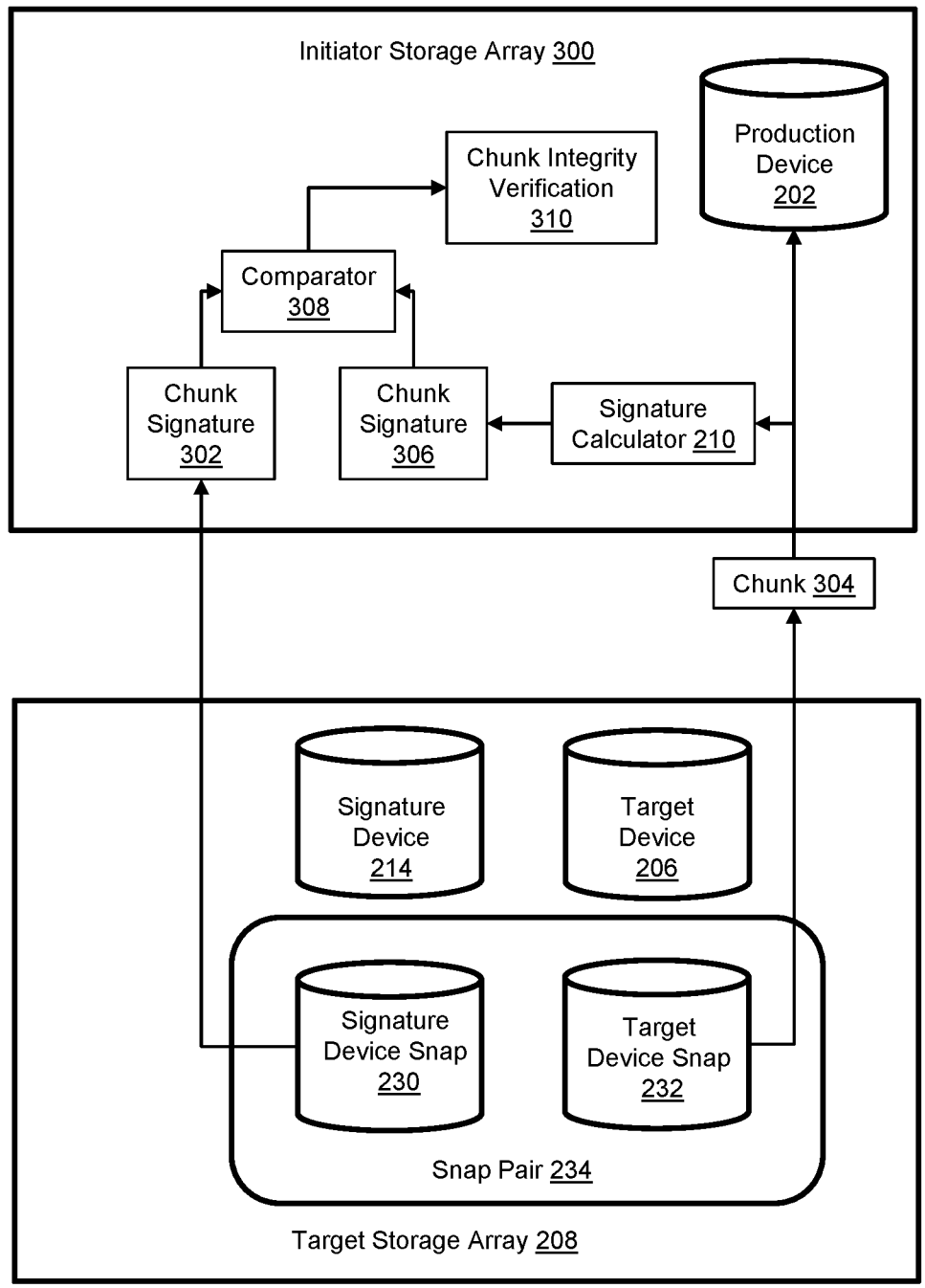
FIG. 3 illustrates a data recovery operation using a snap pair.

FIG. 3 illustrates a data recovery operation using a snap pair. In particular, production device 202 is recovered to the point in time represented by snap pair 234. The recovered production device 202 is shown on an initiator storage array 300 which may be storage array 200 (FIGS. 1 and 2) or a different storage array. In order to perform data recovery, the initiator storage array 300 selects and mounts the signature device snapshot 230 and the target device snapshot 232 of the snap pair 234 corresponding to the point in time to which recovery of the production device 202 is desired. Responsive to commands from the initiator storage array 300, the target storage array 208 selects and sends chunks from the target device snapshot 232 and chunk signatures from the signature device snapshot 230 to the initiator storage array. Chunk 304 and chunk signature 302 are representative. The chunks and chunk signatures are selected and sent in sequential order according to LBAs. The initiator storage array 300 writes the chunks to the production device 202 and uses the signature calculator 210 to calculate chunk signatures of each received chunk, e.g., chunk signature 306 of chunk 304. The chunk signature 306 calculated from chunk 304 by the initiator storage array is compared with the chunk signature 302 received from the target storage array using comparator 308 to yield a chunk integrity verification 310 based on whether the two chunk signatures match.

Figure 4:
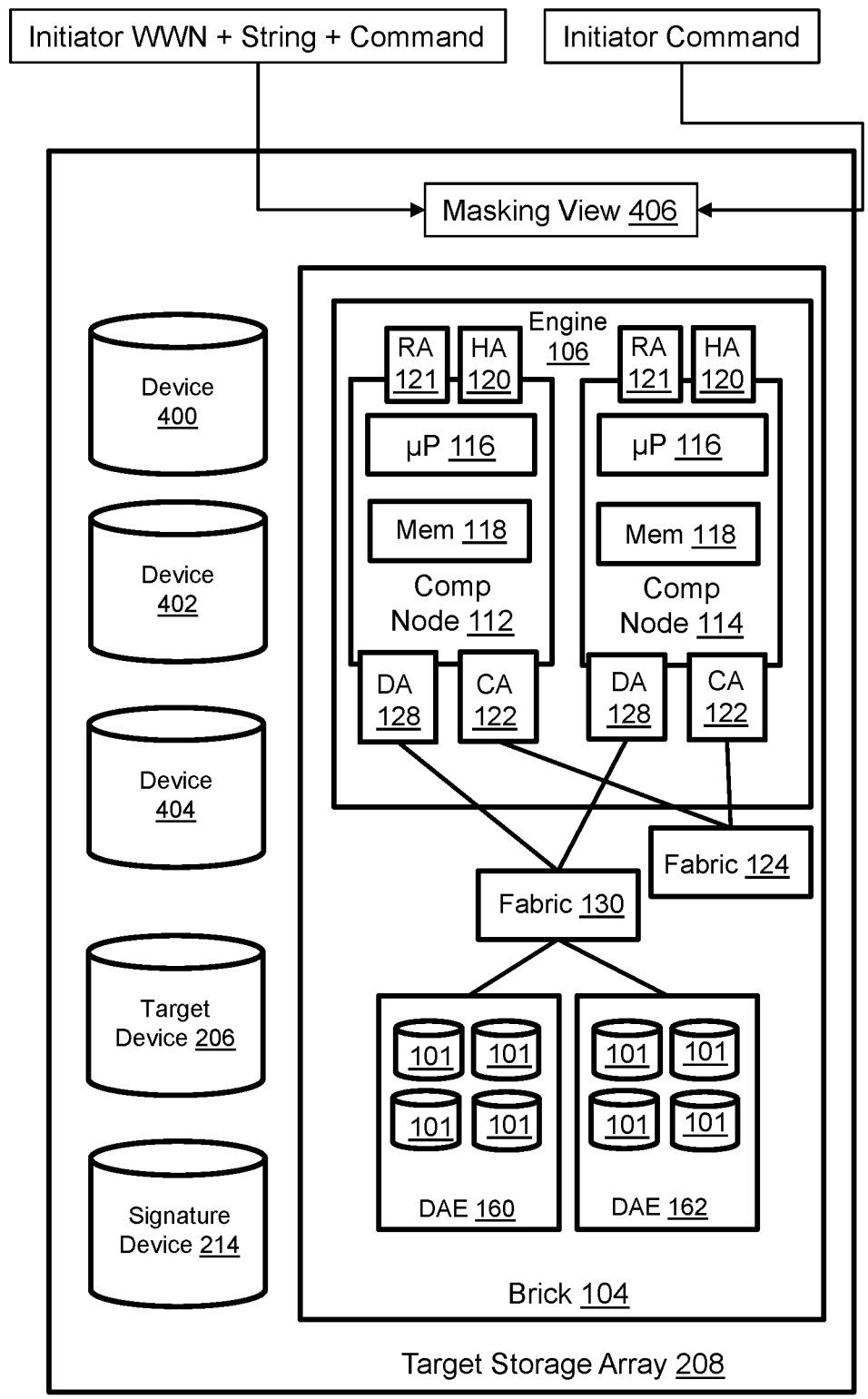
FIG. 4 illustrates aspects of the target storage array and concealment of a target device and signature device.

FIG. 4 illustrates aspects of the target storage array and concealment of a target device and signature device. The target storage array 208 includes at least one brick 104. The brick 104 includes an engine 106 and one or more disk array enclosures (DAEs) 160, 162. Each engine 106 includes two interconnected compute nodes 112, 114 that are arranged as a pair for failover and may be referred to as "storage directors." Although it is known in the art to refer to the compute nodes of a SAN as "hosts," that naming convention is avoided in this disclosure to help distinguish the network server hosts from the compute nodes 112, 114. Nevertheless, the host applications could run on the compute nodes, e.g., on virtual machines or in containers. Each compute node is implemented as a separate blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with host servers. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems such as the initiator storage array. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A back-end connection group includes all disk adapters that can access the same drive or drives. In some implementations, every disk adapter 128 in the storage array can reach every DAE via the fabric 130. Further, in some implementations every disk adapter in the storage array can access every managed disk 101.

Each compute node 112, 114 allocates a fixed amount of its local memory 118 to a shared cache that can be accessed by all compute nodes of the storage array using direct memory access (DMA). The shared cache includes metadata slots and data slots, each of which is a fixed allocation of the shared cache. One or more fixed size data allocation units are used for data access so that storage system metadata is practical to manage. The data allocation units are sometimes referred to as tracks (TRKs). TRK size is selected as a design choice and is generally proportional to the manageability of the metadata, but inversely proportional to resource utilization efficiency. A relatively larger TRK size can reduce the resource burden on memory and processing resources for metadata management but decreases the efficiency of managed drive utilization by increasing unused space. The basic allocation unit of a storage system is distinct from hard disk drive (HDD) tracks that characterize spinning disk storage architecture. An HDD track is a physical characteristic that corresponds to a concentric band on a platter. The TRKs of a storage system are larger in size than HDD tracks and are not limited by the physical architecture of a spinning platter. The basic allocation unit of storage capacity that is used by the compute nodes to access the managed drives is a back-end track (BE-TRK). The host application data is logically stored in front-end tracks (FE-TRKs) on the production storage objects and actually stored on BE-TRKs on the managed drives. Chunk size may correspond to TRK size, e.g., have the same size as FE-TRKs or BE-TRKs.

The FE-TRKs are mapped to the BE-TRKs and vice versa by FE-TRK IDs and BE-TRK IDs, which are pointers that are maintained in the metadata slots. More specifically, the BE-TRK IDs are pointers to BE-TRKs of host application data in the data slots. Host application data is persistently stored on the managed drives 101 and, because the managed drives are not discoverable by the host servers, logically stored on storage objects such as devices 400, 402, 404 that can be discovered by the host servers. Without limitation, a storage object may be referred to as a device, volume, or LUN, where a logical unit number (LUN) is a number used to identify logical storage volumes in accordance with the small computer system interface (SCSI) protocol. From the perspective of the host servers, a storage object is a single disk having a set of contiguous logical block addresses (LBAs) on which data used by the instances of a host application resides. However, the host application data is stored at non-contiguous addresses on various managed drives 101. There may be a large number of host servers and the storage array may maintain a large number of storage objects.

A masking view 406 includes an initiator group, a port group, and a storage group. The storage group includes the identities of storage objects associated with each masking view, of which there may be many. The initiator group includes the world-wide names (WWNs) of the host servers and initiator storage arrays associated with the storage group. The port group indicates the front-end ports via which the host servers and initiator storage arrays are connected to the target storage array. Ordinarily, initiators are able to discover and access the storage objects maintained by the target storage array using discovery commands such as "report LUNs." For example, a host server initiator or initiator storage array can discover devices 400, 402, 404 with such a discovery command and then access the devices. This can be problematic if a malicious actor manages to compromise a host server and use the host server to access or modify the storage objects. In order to conceal target device 206, signature device 214, and all snaps thereof from discovery by malicious actors, the target storage array does not include those devices in response to device discovery commands from initiators. In order to conceal target device 206, signature device 214, and all snaps thereof from access by malicious actors, the target storage array generates a masking view 406 that requires a special string to access associated storage objects. The string may include an IEEE organization unique identifier (OUI) used with the initiator WWN. The target device 206 and signature device 214 on the target array are not initiator-visible or mountable unless the initiator WWN includes the string. For example, the target storage array does not expose the signature device as an existing LUN, such as by reporting its address in response to a "report LUNs" command, to an initiator and grant access unless the initiator WWN includes the string. This helps to protect the signature device from hacking via a compromised host because host initiators are not expected to include the initiator storage array vendor name/product. Such protection may be preferable to encryption because it does not require key management, which is potentially problematic over long time periods. However, the disclosed technique does not preclude use of encryption.

Figure 5:
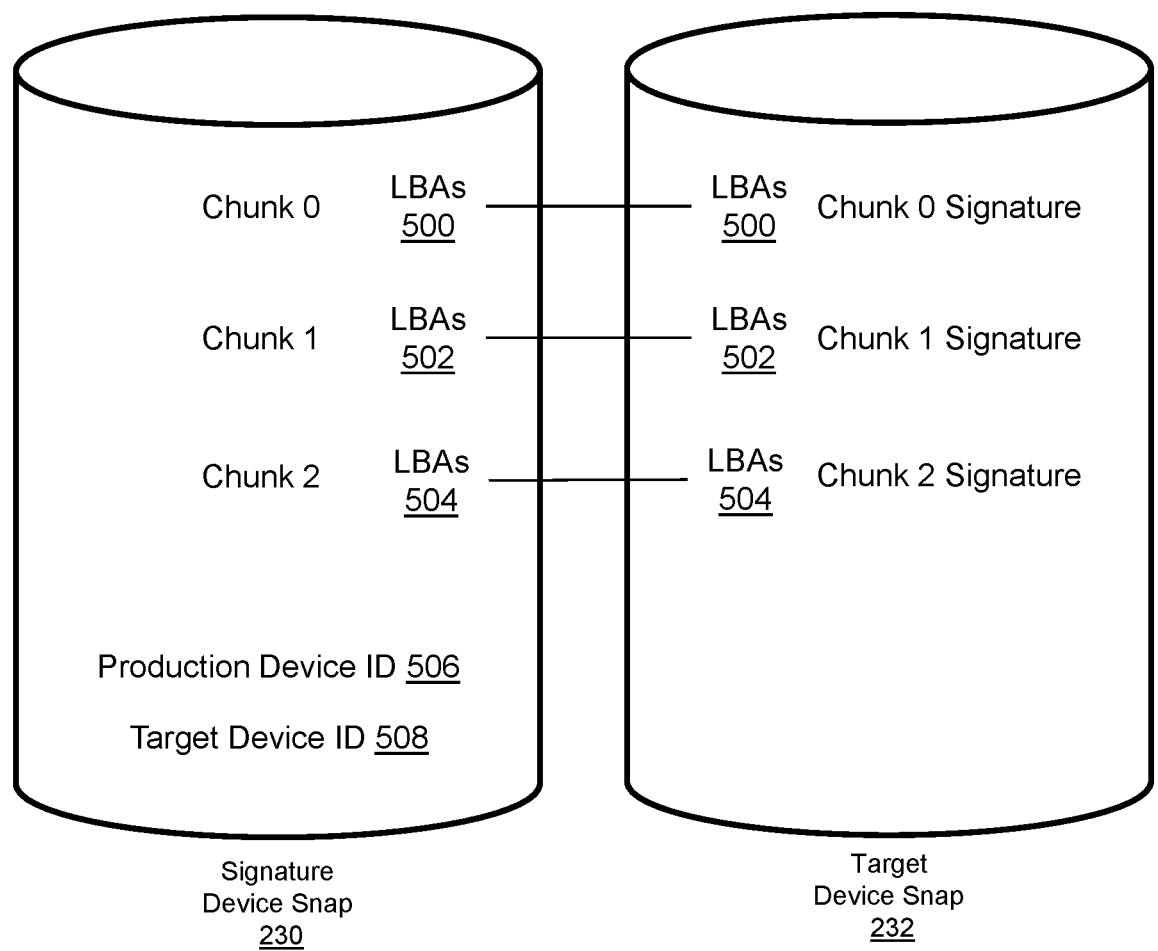
FIG. 5 illustrates how data and signatures are stored on a signature device snap and corresponding target device snap to facilitate identification of chunk signatures for specific chunks.

FIG. 5 illustrates how data and signatures are stored on the signature device snap 230 and corresponding target device snap 232 to facilitate identification of chunk signatures for specific chunks. Both snap volumes have the same capacity organized with the same contiguous range of LBAs. Chunks of data are stored at ranges of LBAs. For example, chunk 0 is stored at LBA range 500, chunk 1 is stored at LBA range 502, and chunk 2 is stored at LBA range 504. The chunk signatures are smaller in size than the chunk data but are stored within the same LBA ranges as their corresponding chunks. For example, the chunk 0 signature is stored at LBA range 500, the chunk 1 signature is stored at LBA range 502, and the chunk 2 signature is stored at LBA range 504. The chunk signatures may be stored at the lowest LBAs within the range or at some other predictable location within the range. Consequently, the associations between chunks and chunk signatures can be found with relative ease.

The signature device snapshot 230 includes metadata that identifies the associated production device on the initiator storage array and target device on the target storage array. The metadata is represented as production device ID 506 and target device ID 508. The metadata facilitates search and verification of appropriate snap pairs for recovery.

Figure 6:
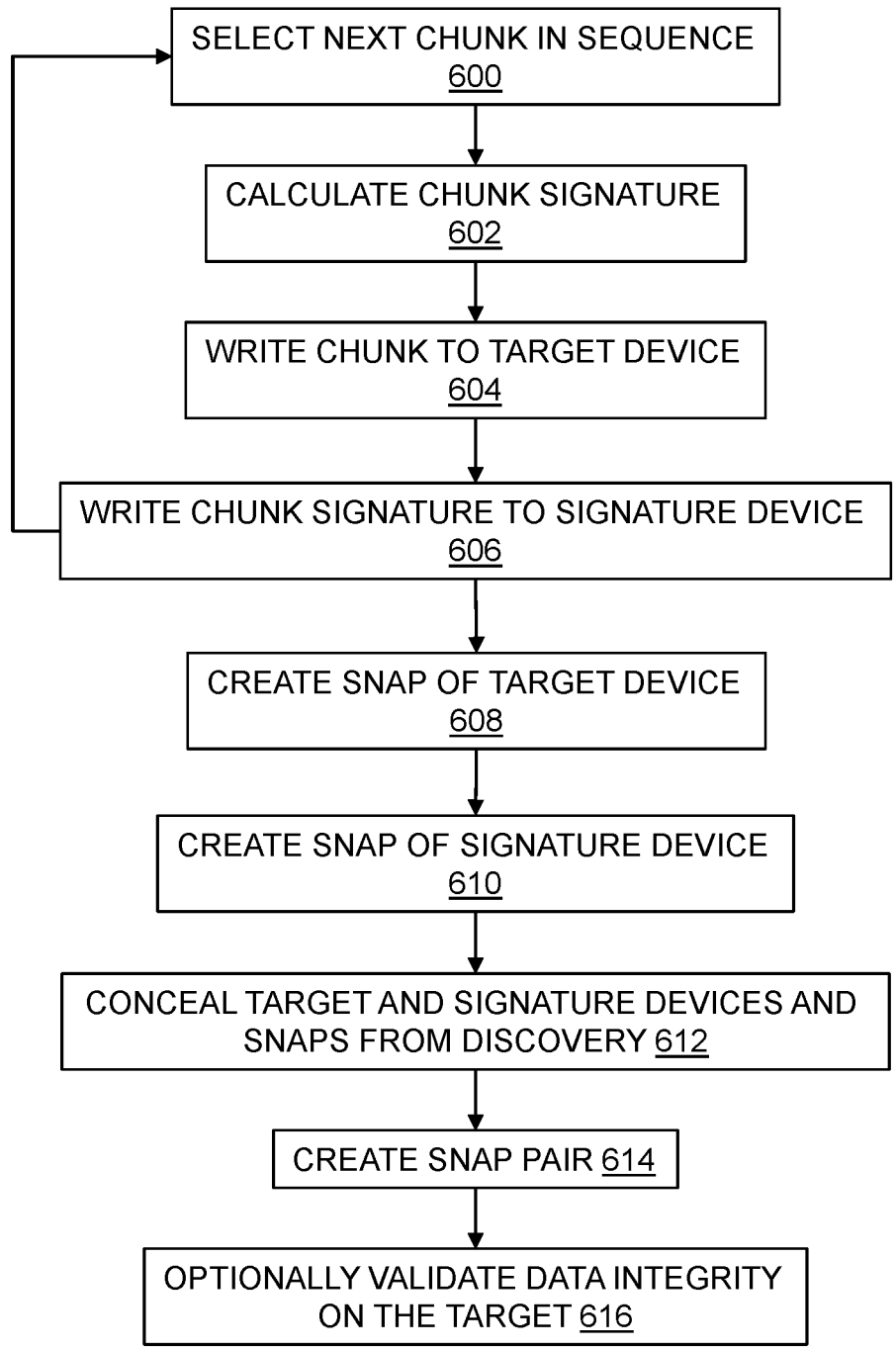
FIG. 6 illustrates steps associated with creation of a snap pair.

FIG. 6 illustrates steps associated with creation of a snap pair from a full device push or incremental push. Step 600 is selecting the next chunk in sequence. The sequence may be determined by LBAs and, in the case of a differential push, only changed chunks are considered. Step 602 is calculating a signature of the selected chunk. As previously mentioned, the signature may be a hash that uniquely represents the chunk data in a smaller space. Step 600 and 602 are performed by the initiator storage array. Step 604 is writing the chunk to the target device on the target storage array. Step 606 is writing the chunk signature to the signature device on the target storage array. Steps 600 through 606 are iterated until all chunk or all changed chunks are processed, depending on whether it is a full or differential push. When the iterations are complete, a snapshot of the target device is generated on the target storage array as indicated by step 608. Further, a snapshot of the signature device is generated on the target storage array as indicated by step 610. As indicated by step 612, the target and signature devices and snaps are concealed from discovery. This may include generation of a mask view that requires a special string, e.g., based on the IEEE OUI ID of the initiator storage array. Step 614 is generating a snap pair from the signature device snapshot and the target device snapshot. This may include storing a production device ID and target device ID on the signature device snapshot. The snap pair represents the state of the production device at a specific point in time that is also stored as metadata. Optional step 616 is validating the integrity of the target device snapshot on the target storage array by comparing signatures from the signature device snap with signatures generated from chunks on the target device snapshot. Step 616 could be performed by the target storage array or some other network appliance, e.g., an appliance that has higher bandwidth connectivity to the target storage array than the initiator storage array.

Figure 7:
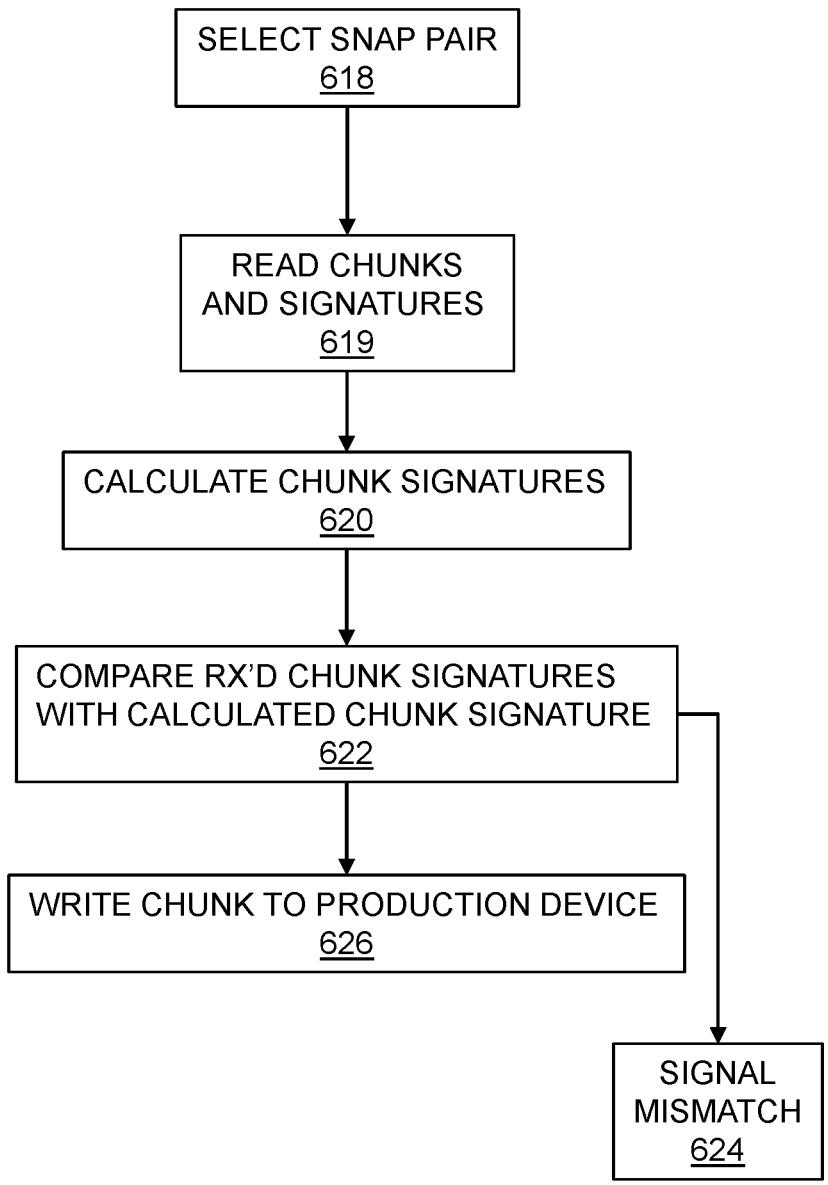
FIG. 7 illustrates steps associated with recovery using a snap pair.

FIG. 7 illustrates steps associated with recovery using a snap pair. Step 618 is selecting the snap pair corresponding to the point in time to which a production device will be recovered. Step 619 is reading the data chunks and chunk signatures from the target device and signature device of the selected snap pair. Step 620 is calculating signatures of the chunks read in step 619. Reading chunks and calculating signatures may be performed serially, in order according got LBAs. Step 622 is comparing the received chunk signatures with the calculated chunk signatures. As indicated in step 624, a mismatch is signaled if a received chunk signature fails to match the corresponding calculated chunk signature. The chunk and signature may be resent from the target storage array. Step 626 is writing the chunk to the production device in the case in which the received chunk signature matches the corresponding calculated chunk signature.

Among the potential advantages of some implementations is management of incremental changes to a storage device and the associated signatures without a need for Merkle trees. Each new generation of a signature device will only store the changed signatures. Because the signatures are saved on the signature device sequentially, e.g., statically mapping chunks to chunk signatures, it is relatively easy to locate a signature for a specific chunk. Another potential advantage is hiding the signature devices and target devices from potentially compromised hosts, such as by causing them to be visible only to a storage array with a specific OUI. This enhances data safety and decreases the likelihood of hacking of snapshots. Another potential advantage is enhanced efficiency. Signatures are calculated by the initiator storage array on the snap being shipped, so the initiator storage array is not rereading the data from the target storage array to calculate signatures. Moreover, there is no requirement for the initiator storage array to maintain the signatures as data changes.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
receiving one or more chunks of data from a production device at a storage array;
selecting at least one of the one or more of the chunks of data by the storage array;
for each individually selected chunk, the storage array:
calculating a chunk signature;
sending the chunk to a target device on a remote storage system; and
sending the chunk signature to a signature device on the remote storage system; and
remotely relative to the storage array:
creating a first signature device snapshot;
creating a first target device snapshot; and
associating the first signature device snapshot and the first target device snapshot as a first snap pair.

2. The method of claim 1 further comprising the remote storage system creating the first signature device snapshot, creating the first target device snapshot, and associating the first signature device snapshot and the first target device snapshot as the first snap pair.

3. The method of claim 2 further comprising the storage array selecting all changed chunks of data of the production device and, for each selected changed chunk individually:
calculating a changed chunk signature;
sending the changed chunk to the target device on the remote storage system; and
sending the changed chunk signature to the signature device on the remote storage system.

4. The method of claim 3 further comprising the remote storage system creating a second signature device snapshot, creating a second target device snapshot, and associating the second signature device snapshot and the second target device snapshot as a second snap pair.

5. The method of claim 4 further comprising the remote storage system calculating signatures of the changed chunks from the second target device snapshot and comparing those signatures with the changed chunk signatures from the second signature device snapshot to validate chunk data.

6. The method of claim 4 further comprising a second storage array selecting the second snap pair, receiving all chunks of data of the second target device snapshot, receiving all chunk signatures of the second signature device snapshot, calculating signatures of each of the received chunks from the second target device snapshot, and comparing those signatures with the chunk signatures from the second signature device snapshot to validate chunk data.

7. The method of claim 1 further comprising the remote storage system omitting the signature device and the target device from responses to device discovery commands.

8. The method of claim 1 further comprising the remote storage system creating a masking view that conceals the signature device and the target device from access by an initiator unless a predetermined organization unique identifier is provided by the initiator.

9. The method of claim 1 further comprising the signature device and the target device storing the chunk signatures and corresponding chunks, respectively, within same ranges of logical block addresses such that a first chunk is stored at first range of logical block addresses of the target device and a first chunk signature of the first chunk is stored within the first range of logical block addresses of the signature device.

10. An apparatus comprising:
a storage array configured to select all chunks of data of a production device and, for each selected chunk individually:

calculate a chunk signature;

send the chunk to a target device on a remote storage system; and send the chunk signature to a signature device on the remote storage system; and a remote system configured to create a first signature device snapshot, create a first target device snapshot, and associate the first signature device snapshot and the first target device snapshot as a first snap pair.

11. The apparatus of claim 10 further comprising the remote storage system being the remote system configured to create the first signature device snapshot, create the first target device snapshot, and associate the first signature device snapshot and the first target device snapshot as the first snap pair.

12. The apparatus of claim 11 further comprising the storage array being configured to select all changed chunks of data of the production device and, for each selected changed chunk individually:

calculate a changed chunk signature;

send the changed chunk to the target device on the remote storage system; and send the changed chunk signature to the signature device on the remote storage system.

13. The apparatus of claim 12 further comprising the remote storage system being configured to create a second signature device snapshot, create a second target device snapshot, and associate the second signature device snapshot and the second target device snapshot as a second snap pair.

14. The apparatus of claim 13 further comprising the remote storage system being configured to calculate signatures of the changed chunks from the second target device snapshot and compare those signatures with the changed chunk signatures from the second signature device snapshot to validate chunk data.

15. The apparatus of claim 13 further comprising a second storage array configured to select the second snap pair, receive all chunks of data of the second target device snapshot, receive all chunk signatures of the second signature device snapshot, calculate signatures of each of the received chunks from the second target device snapshot, and compare those signatures with the chunk signatures from the second signature device snapshot to validate chunk data.

16. The apparatus of claim 10 further comprising the remote storage system being configured to omit the signature device and the target device from responses to device discovery commands.

17. The apparatus of claim 10 further comprising the remote storage system being configured to create a masking view that conceals the signature device and the target device from access by an initiator unless a predetermined organization unique identifier is provided by the initiator.

18. The apparatus of claim 10 further comprising the signature device and the target device being configured to store the chunk signatures and corresponding chunks, respectively, within same ranges of logical block addresses such that a first chunk is stored at first range of logical block addresses of the target device and a first chunk signature of the first chunk is stored within the first range of logical block addresses of the signature device.

19. A non-transitory computer-readable storage medium storing instructions that when executed by processors perform a method comprising:

selecting all chunks of data of a production device by a storage array and, for each selected chunk individually:

calculating a chunk signature;

sending the chunk to a target device on a remote storage system; and sending the chunk signature to a signature device on the remote storage system; and remotely relative to the storage array:

creating a first signature device snapshot;

creating a first target device snapshot; and associating the first signature device snapshot and the first target device snapshot as a first snap pair.

20. The non-transitory computer-readable storage medium of claim 19 wherein the method further comprises the remote storage system creating the first signature device snapshot, creating the first target device snapshot, and associating the first signature device snapshot and the first target device snapshot as the first snap pair.

\* \* \* \* \*